United States Patent
Gupta et al.

(10) Patent No.: US 8,510,427 B1
(45) Date of Patent: Aug. 13, 2013

(54) METHOD AND APPARATUS FOR IDENTIFYING REFERENCED CONTENT WITHIN AN ONLINE PRESENTATION ENVIRONMENT

(75) Inventors: Vikas Gupta, Delhi (IN); Gaurav Satija, Haryana (IN)

(73) Assignee: Adobe Systems Incorporated, San Jose, CA (US)

( * ) Notice: Subject to any disclaimer, the term of this patent is extended or adjusted under 35 U.S.C. 154(b) by 90 days.

(21) Appl. No.: 13/229,176

(22) Filed: Sep. 9, 2011

(51) Int. Cl.
*G06F 15/173* (2006.01)

(52) U.S. Cl.
USPC .............. 709/223; 709/203; 709/217

(58) Field of Classification Search
USPC .............. 709/203, 206, 217, 219, 223, 224
See application file for complete search history.

(56) References Cited

U.S. PATENT DOCUMENTS

| | | | |
|---|---|---|---|
| 7,762,672 B2 * | 7/2010 | Yokoyama et al. | 353/42 |
| 7,934,160 B2 * | 4/2011 | Bono et al. | 715/732 |
| 8,065,367 B1 * | 11/2011 | Stanley | 709/205 |
| 8,266,534 B2 * | 9/2012 | Curtis et al. | 715/753 |
| 2001/0034762 A1 * | 10/2001 | Jacobs et al. | 709/204 |
| 2004/0002049 A1 * | 1/2004 | Beavers et al. | 434/350 |
| 2005/0144258 A1 * | 6/2005 | Burckart et al. | 709/218 |
| 2005/0203999 A1 * | 9/2005 | Muguda et al. | 709/205 |
| 2007/0100939 A1 * | 5/2007 | Bagley et al. | 709/204 |
| 2008/0228876 A1 * | 9/2008 | Johnson | 709/204 |
| 2010/0123661 A1 * | 5/2010 | Chen | 345/158 |
| 2010/0162135 A1 * | 6/2010 | Wanas et al. | 715/753 |
| 2011/0193777 A1 * | 8/2011 | Zhou et al. | 345/157 |
| 2012/0017182 A1 * | 1/2012 | Bau | 715/859 |
| 2012/0117156 A1 * | 5/2012 | Anka | 709/205 |

* cited by examiner

*Primary Examiner* — Lashonda Jacobs
(74) *Attorney, Agent, or Firm* — Moser Taboada

(57) ABSTRACT

A method and apparatus for identifying referenced content within an online presentation environment. Upon entry of a statement related to specific content being presented within the online presentation environment, the method and apparatus identify the specific content within the presentation and, upon subsequent selection of the statement, display the specific content.

18 Claims, 6 Drawing Sheets

METHOD AND APPARATUS FOR IDENTIFYING REFERENCED CONTENT WITHIN AN ONLINE PRESENTATION ENVIRONMENT

BACKGROUND OF THE INVENTION

1. Field of the Invention

Embodiments of the present invention generally relate to online presentation environments and, more particularly, a method and apparatus for identifying referenced content within an online presentation environment.

2. Description of the Related Art

With the rapid growth of the Internet, people are moving to online meetings, presentations and collaboration using various web based tools such as ADOBE CONNECT® available from Adobe Systems Incorporated. A typical use case involves a presentation wherein one or more people (referred to herein as presenters) present a presentation containing content to a number of interested people (referred to herein as participants). Such a presentation may comprise any form of content (e.g., images, text, multimedia and the like) that is disclosed by one or more people to one or more other people for any purpose (e.g., discussion, collaboration, training, sharing and the like). The view of the content is generally the same for all presenters and participants in order to maintain synchronization of the presentation. The presenters are typically transmitting audio via voice over IP (VoIP), traditional telephone or through an Internet connection and computer, while the viewable content is shared with the participants via an online presentation environment displayed on a computer.

Within the presentation environment, the participants may ask questions and post comments (generally make statements) regarding the presentation. As the statements are entered, the presenters may respond to those statements. However, typically the presenter continues the presentation after the statement has been received by the presenter and will provide an answer when convenient to the presenter. At that time, the content relevant to the statement may no longer be displayed to the presenter or the participants. This may result in confusion and a lengthy discussion to determine the relevant content.

Additionally, when the presenters review the statements after the presentation, identity of the content related to the statements is lost. This lack of connection to the relevant content causes the post-presentation analysis to be less than optimal.

Therefore, there is a need in the art for a method and apparatus for identifying referenced content within an online presentation environment.

SUMMARY OF THE INVENTION

Embodiments of the present invention comprise a method and apparatus for identifying referenced content within an online presentation environment. Upon entry of a statement related to specific content being presented within the online presentation environment, the method and apparatus identify the specific content within the presentation and, upon subsequent selection of the statement, display the specific content.

Figure 1:
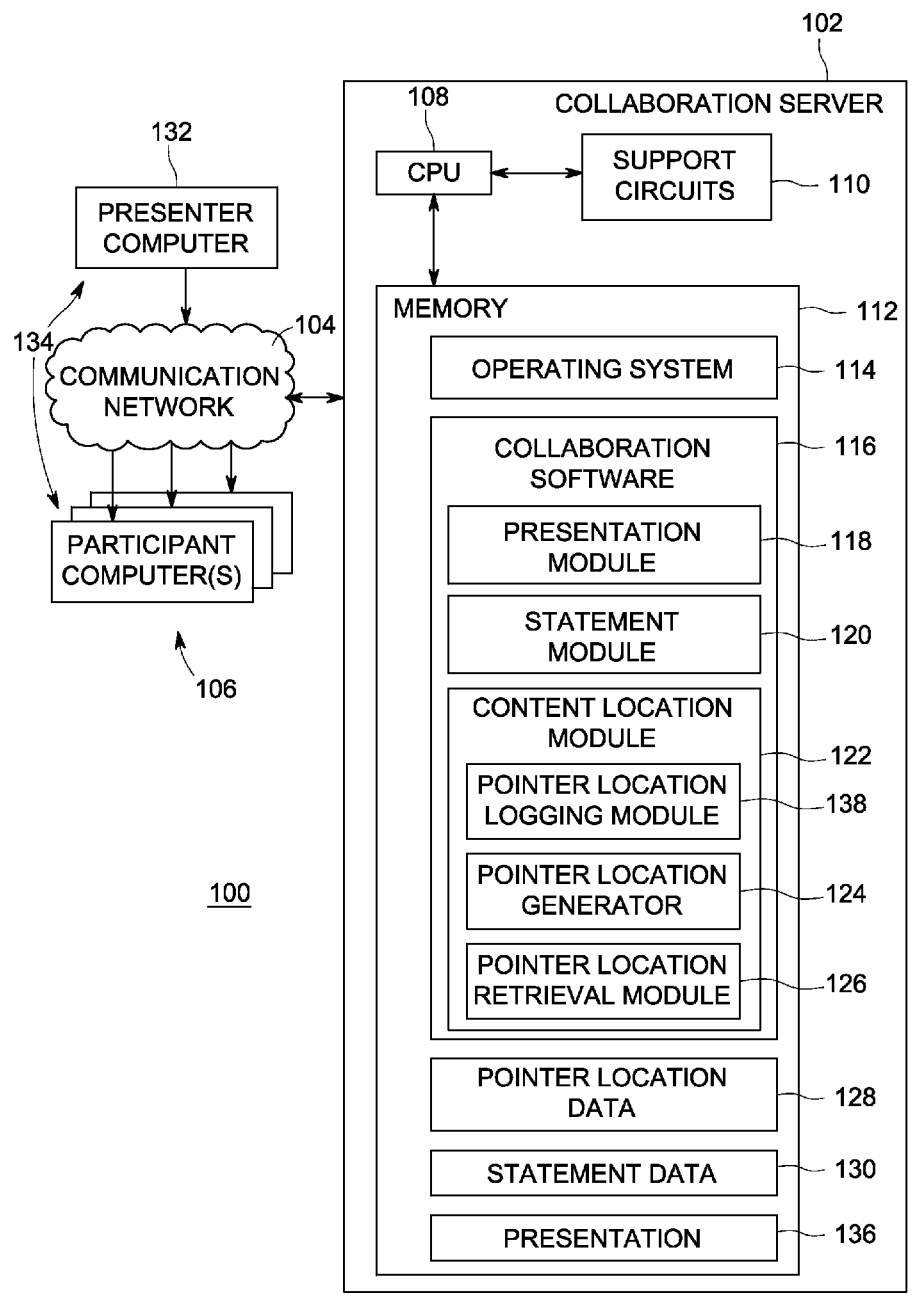
FIG. 1 depicts a block diagram of collaboration system for supporting an online presentation environment in accordance with at least one embodiment of the invention.

While the method and apparatus for identifying referenced content within an online presentation environment is described herein by way of example for several embodiments and illustrative drawings, those skilled in the art will recognize that the method and apparatus for identifying referenced content within an online presentation environment is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for identifying referenced content within an online presentation environment as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for identifying referenced content within an online presentation environment are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the present invention comprise a method and apparatus for identifying referenced content within an online presentation environment. Within an online presentation environment, a presenter presents at least one page of a presentation while utilizing a pointer to identify content relevant to the presentation. Whenever a participant makes a statement (e.g., question or comment), the embodiment determines a relevant location of the pointer in the page being displayed at the time the statement is entered into a chat area or question-and-answer area of the online presentation environment. Subsequent selection of the statement by the presenter accesses the relevant content information associated with the captured pointer location and displays the relevant content of the presentation related to the statement. In this manner, statements are automatically linked to the relevant content of the presentation; thus, facilitating efficient processing of the statement either during or after the presentation.

FIG. 1 depicts a block diagram of collaboration system 100 for supporting an online presentation environment in accordance with at least one embodiment of the invention. The collaboration system 100 comprises a collaboration server 102 coupled to a plurality of client computers 134 (represented as presenter computer 132 and participant computers $106_1, 106_2, \ldots 106_n$ collectively 106) coupled to one another via a communications network 104. The collaboration server 102 supports an online presentation environment enabling the presenter computer 132 to interactively share a presentation 136 with the participant computers 106. In one specific embodiment, an on-line presentation environment is provided through execution of collaboration software 116 on the collaboration server 102, where such software comprises ADOBE CONNECT available from Adobe Systems Incorporated.

More specifically, the collaboration server 102 comprises a central processing unit (CPU) 108, support circuits 110 and memory 112. The CPU 108 may comprise one or more commercially available microprocessors and microcontrollers that facilitate data processing and storage. Various support circuits 110 facilitate operation of the CPU 108 and may include, well known circuits such as clock circuits, buses, power supplies, input output circuits, network interface cards, and/or the like. The memory 112 includes read only memory, random access memory, and/or combinations thereof. The memory 112 stores various software packages such as an operating system 114 and collaboration software 116, as well as various data, such as the pointer location data 128 and the statement data 130. The collaboration software 116 comprises a plurality of modules including a presentation module 118, a statement module 120, and a content location module 122. The content location module further comprises a pointer location generator 124, a pointer or location retrieval module 126 and a pointer location logging module 138.

The client computers 134, e.g., presenter computer 132 and participant computers 106, comprise a plurality of computing devices including, but not limited to, desktop computers, laptop computers, notebook computers, smart phones, tablet computers, and/or any other computing device enabling display and interaction with a presentation within an online presentation environment.

The collaboration server 102 is a general-purpose computer that, when executing the collaboration software, becomes a specific purpose computer for providing an online presentation environment. In operation, the client computers 134 collaborate with one another via the collaboration server 102. The presenter computer 132 hosts a presentation by interacting with the environment provided by the collaboration software 116. More specifically, the presenter computer 132 shares a presentation with the participant computers 106. The presentation module 118 facilitates the sharing of the presentation. A statement module 120 facilitates the participant computers 106 ability to make statements (e.g., a question and/or comment) regarding the presentation and facilitates the presenter computer(s) 132 to respond to those statements. These statements may be displayed as part of a chat session or within a question-and-answer region of the display as described further with respect to FIG. 4 below.

Whenever a statement is entered, the content location module 122 invokes the pointer location generator 124 to identify and store the specific location of a presentation pointer being used in conjunction with the presentation. The specific location (e.g., page of the presentation and a two-dimensional coordinate of a pointer location on the page) is stored as pointer location data 128 in association with the related statement as statement data 130. In an alternative embodiment, the content location module 122 may reside in the client computers 134 and execute on the client computers to perform the tasks described with respect to the content location module 122 executing on the collaboration server 102.

At any subsequent time after the statement has been entered, the presenter may select the statement within the collaborative environment. Upon selection, the pointer retrieval module 126 is invoked and the presentation module 118 displays the content proximate a specific location of the pointer at the time the statement was entered.

Figure 6:
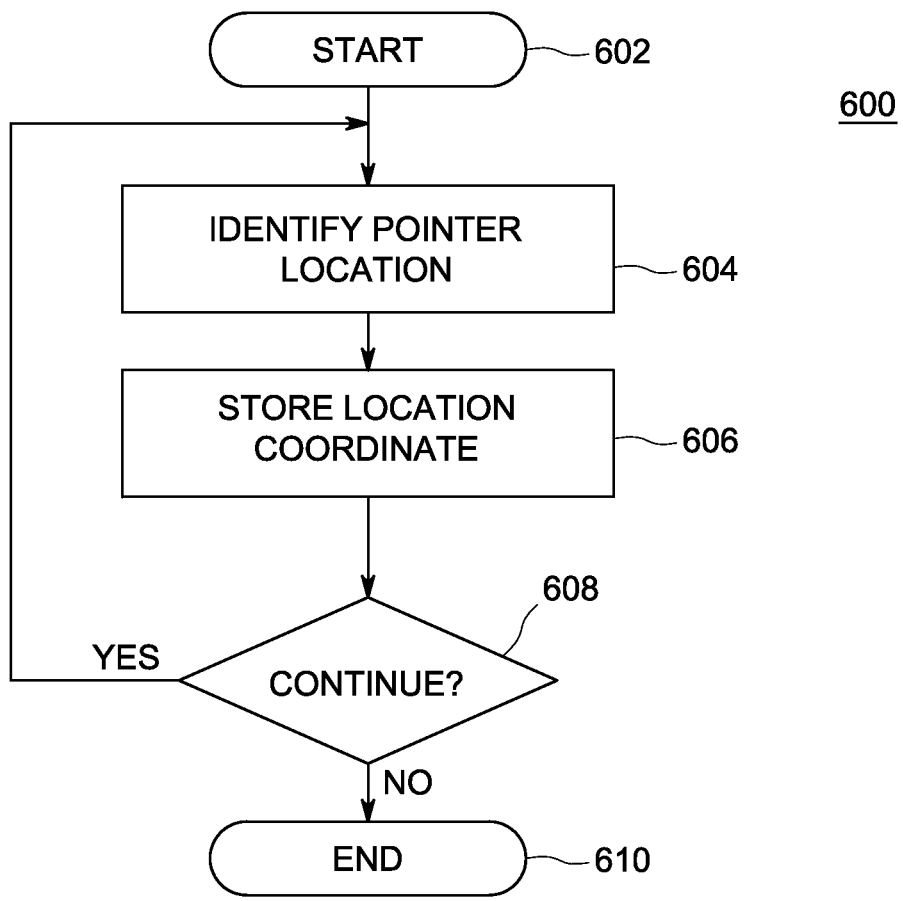
FIG. 6 depicts a flow diagram of a method for logging a presentation pointer location used within the online presentation environment of FIG. 1 in accordance with at least one embodiment of the invention.

FIG. 6 depicts a flow diagram of a method 600 for logging a presentation pointer location used within the online presentation environment of FIG. 1 in accordance with at least one embodiment of the invention. The method 600 represents one embodiment of the pointer location logging module 138 of FIG. 1. The pointer locations generated by the pointer location logging module 138 are stored in memory 112 of FIG. 1 as part of the pointer location data 128. In one embodiment, the method 600 begins at step 602 and proceeds to step 604 wherein the method 600 identifies the current pointer location (e.g., the presentation page number and a two-dimensional coordinate (x,y) within the page that identifies the location of the presentation pointer). In this particular embodiment, at step 606, the method 600 stores the location information— page number and coordinate—in memory (memory 112 of FIG. 1 as part of pointer location data 128). At step 608, the method 600 queries whether the method should continue. If the query is affirmatively answered, the method returns to step 604; otherwise, the method 600 ends at step 610. The method 600 ends when the presentation environment is closed, e.g., the presentation ends.

In the embodiment of FIG. 6, the method 600 periodically stores pointer location information in a table. The method is invoked periodically and executes until the presentation is ended, and step 608 is executed with a periodicity that facilitates collection of pointer location information on a periodic basis. In other embodiments, the presentation pointer location is logged each time the presentation pointer begins to move and/or each time the presentation pointer ceases to move. As such, to implement this alternative embodiment, a pointer motion detection sub-routine (not shown) would be incorporated into step 604.

Figure 2:
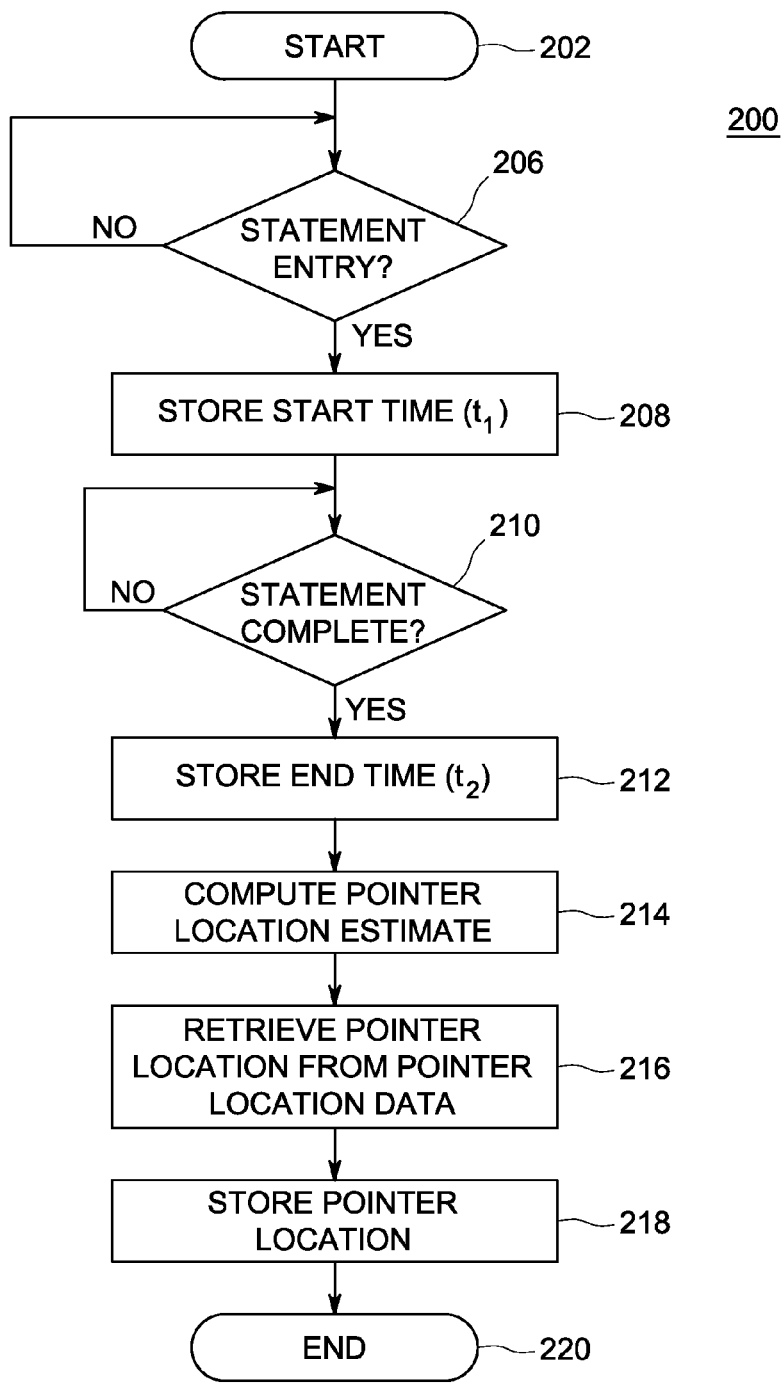
FIG. 2 depicts a flow diagram of a method for determining pointer location within the online presentation environment of FIG. 1 in accordance with at least one embodiment of the invention.

FIG. 2 depicts a flow diagram of a method 200 for determining pointer location within the online presentation environment of FIG. 1 in accordance with at least one embodiment of the invention. The method 200 represents one embodiment of the pointer location generator 124 of FIG. 1. The intent of method 200 is to identify specific content within the presentation that is being discussed at the time a statement (question and/or comment) is entered by a participant. In one embodiment, the specific content is content near the presentation pointer at the time a statement is entered. The statement is typically entered via a chat region or a question-and-answer region of the online presentation environment. The embodiment of method 200 identifies this specific content through identification of a location of a presentation pointer being used by a presenter at the time, and/or prior to, the statement is entered. It is assumed that the pointer will be positioned proximate content that is related to the statement at the time the statement is entered. This embodiment provides a technique that will allow specific content to be displayed in relation to the statement. In other embodiments, less granularity may be used such that the identified content is a presentation page being displayed at the time the statement is entered. Those skilled in the art will understand that other techniques for identifying content being displayed at the time the statement is entered are within the scope of the present invention.

At step 206, the method 200 queries whether a statement has begun to be entered. In various embodiments, this may be a wait loop or the method 200 may be an interrupt routine that is invoked only when a statement has begun to be entered. If the query is negatively answered, the method 200 continues to loop until a statement entry is detected. If a statement has begun to be entered, the method 200 proceeds to step 208 wherein the start time ($t_1$) (i.e., a first time) of the statement entry is stored in memory (e.g., statement data 130). At step 210, the method queries whether the statement is complete (i.e., has time elapsed after the last keystroke of the statement, or the ENTER key is pressed to submit the query). If the statement is deemed not to be complete, the method 200 waits for completion of the statement. Once the statement is complete, at step 212, the method 200 stores an end time ($t_2$) (i.e., a second time) for the statement entry.

At step 214, the method 200 computes a pointer location estimate based upon the first and second times. In one embodiment, the function used for calculating the pointer location estimate is a weighted mean that estimates the position of the pointer prior to entry of the statement. It is assumed that by the time a participant begins typing a statement related to content in a presentation, the presenter may have already moved to the next topic within the content. The intent of step 214 is to estimate the location of the specific content related to the statement. Thus, the computation is divided into two components. The first component uses a weighted function for a time prior to the statement beginning to be entered, and a second component uses a weighted function for the duration the statement is being entered.

A constant p is established as the amount of time prior to the participant beginning to enter the statement such that the first component of the weighted mean is computed from time ($t_1-p$) to time ($t_1$). The weighting is an exponential function having the form $$ae^{-bt} \qquad (1)$$

where a and b are constants and t is the time duration with respect to the typing start time.

For the second component, the weights used to calculate the mean for the duration from ($t_1$) to ($t_2$) having lower value than the weighting in the first component because this Is the duration when the participant is typing the question and there is a high probability that the question has already been decided by the participant when he or she had started typing the question. As such, the weight will be maximum at ($t_1$), and decreases as the function proceeds towards ($t_2$). The weight is defined by the exponential function:

$$le^{-mt}+n \qquad (2)$$

where l, m and n are constants and t is the time duration with respect to ($t_1$).

The constants are selected such that the value of the function becomes zero at $t=(t_2)$.

The mean value (i.e., the pointer location estimate) identifying the most likely location of the content within a page that is related to the statement is defined as:

$$x = \frac{\int_{t_1-p}^{t_2} w(t)x(t)dt}{\int_{t_1-p}^{t_2} w(t)dt} \quad y = \frac{\int_{t_1-p}^{t_2} w(t)y(t)dt}{\int_{t_1-p}^{t_2} w(t)dt} \qquad (3)$$

$$\text{where, } w(t) = \begin{cases} ae^{-bt}, & \text{when } t \leq t_1 \\ le^{-mt}+n, & \text{when } t_q < t \leq t_2 \end{cases}$$

At step 216, the method 200 retrieves a pointer location from the pointer location data previously logged during the presentation. A specific location retrieved from the data is the nearest actual logged location to the location estimate derived above using equation 3. At step 218, the method 200 stores the specific pointer location and associates the location with the statement. Specifically, in one embodiment, the pointer location is a combination of the presentation page as well as a two-dimensional coordinate (x,y) identifying the pointer location within the page. In other embodiments, a snapshot of the screen region proximate the pointer location may be stored. In other embodiments, multiple statements may be entered simultaneously (or nearly simultaneously). The method 200 may hierarchically organize the statements and pointer locations in the order received, in an optimized order, predefined order, random order or the like. The method may also store a single pointer location related to all simultaneous (or near simultaneous) statements entered proximate that pointer location. The method 200 ends at step 220.

Figure 3:
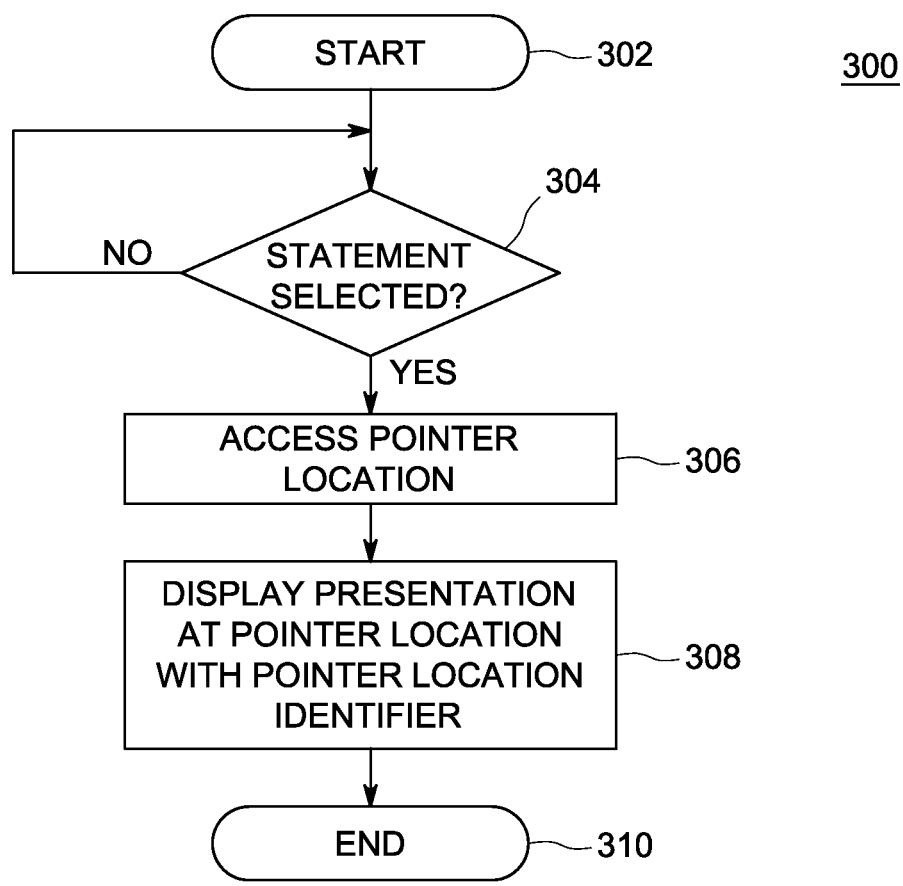
FIG. 3 depicts a flow diagram of a method for retrieving a pointer location within the online presentation environment of FIG. 1 in accordance with at least one embodiment of the invention.

FIG. 3 depicts a flow diagram of a method 300 for retrieving a pointer location related to a specific statement within the online presentation environment of FIG. 1 in accordance with at least one embodiment of the invention. The method 300 is an example of one embodiment of an implementation of the pointer location retrieval module 126 of FIG. 1.

Upon execution, the method 300 begins at step 302 and proceeds to step 304. The method 300 waits at step 304 until the presenter selects a statement. By selecting a statement, the presenter is indicating that he/she is interested in answering a question or responding to a comment. Once the statement is selected, the method 300 proceeds to step 306 wherein the method accesses a pointer location (e.g., page and two-dimensional coordinate) related to the selected statement. In one embodiment, positioning a mouse pointer over the statement causes a "pop up" to appear that contains the location (e.g., page or page and two-dimensional coordinate) of the referenced content. In other embodiments, the pop up may contain a clip of the referenced content.

At step 308, the method 300 displays the presentation at the pointer location along with a pointer location identifier (e.g., positioning a pointer or other command icon in the pointer location). In other embodiments of the invention, the content proximate the pointer location may be highlighted or otherwise enhanced. In other embodiments, a pointer location identifier or other indicia of content location may not be utilized and only the page containing the content related to the statement is displayed. The method ends at step 310.

Figure 4:
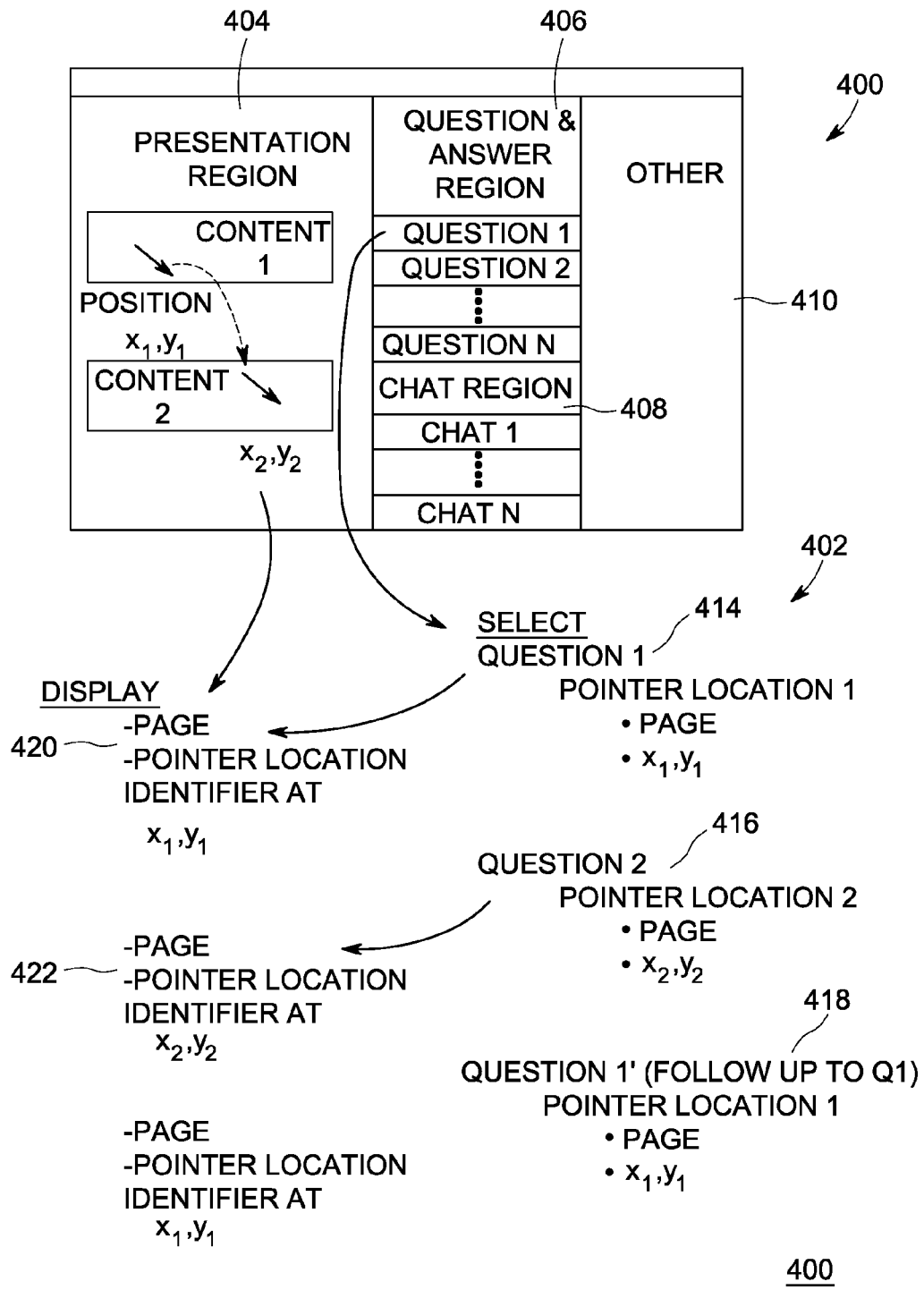
FIG. 4 depicts a representation of a display screen and the referenced content information used within the online presentation environment of FIG. 1 in accordance with at least one embodiment of the invention.

FIG. 4 depicts a representation of a display 400 and the referenced content information 402 used within the online presentation environment of FIG. 1 in accordance with at least one embodiment of the invention. The display screen 400 depicts an example of one embodiment of a presentation environment. The display 400 comprises a presentation region 404, a question-and-answer region 406, a chat region 408, and a region 410 for other collaborative content. In the embodiment shown, during the presentation, the presenter identifies Content 1 while positioning the presentation pointer 412 at position $(x_1,y_1)$. When the pointer was moved to this location, the pointer location generator (124 in FIG. 1) logs the pointer location as a presentation page and a two-dimensional coordinate. When the presentation pointer is moved Proximate Content 2 at position $(x_2,y_2)$, the pointer location generator again logs the pointer location as a presentation page and a two-dimensional coordinate.

As described above with respect to FIG. 2, if Question 1 is entered by a participant in question-and-answer region 406 while the presenter is discussing Content 1, the nearest logged pointer location is determined using Equation 3 and is associated with Question 1 at 414. If Question 2 is entered by a participant in the question-and-answer region 406 while the presenter is discussing Content 2, the nearest logged pointer location is associated with Question 2 at 416. Subsequently, the presenter may, at any time, select a question (e.g., point and click) which invokes the pointer location retrieval module (122 in FIG. 1) to access the pointer location referenced by the selected question. The resulting referenced content at the identified page and two-dimensional coordinate (420) will be displayed in the presentation region 404. The pointer 412 or other indicia may also be displayed to further identify the relevant content. Similarly, when Question 2 is selected, the pointer location retrieval module accesses the pointer location related to Question 2 (422) and displays the related content.

When a participant enters a statement that is related to a prior statement (e.g., a follow-up question), the pointer location generator stores a pointer location of the base question (e.g., location at 414 for Question 1 is stored at 418 with relation to Question 1'). Although statements entered in a question-and-answer region are described above, the same functionality can be applied to statements and other commentary entered into the chat region 408. As such, when a presenter decides to respond to a statement made by a participant within a portion of the presentation environment, the content related to the statement will be automatically displayed when the presenter selects the statement.

In various other use cases, embodiments of the invention may find use to enable a participant that joins a session (e.g., meeting or presentation) late, the participant can quickly review questions and the related content to each question while the presentation continues. Using the embodiments described herein, participants always know which questions have already been asked during the session and what content is related to each question. Once the statements are complete and the presentation concludes, the statements may be exported for later use and analysis. In one embodiment, the exported statements are embedded within a file (presentation document) having a PDF format. In a further embodiment, the presentation document may be published including the statements using a service such as acrobat.com; thus, facilitating sharing of the presentation and its related statements.

Example Computer System

Figure 5:
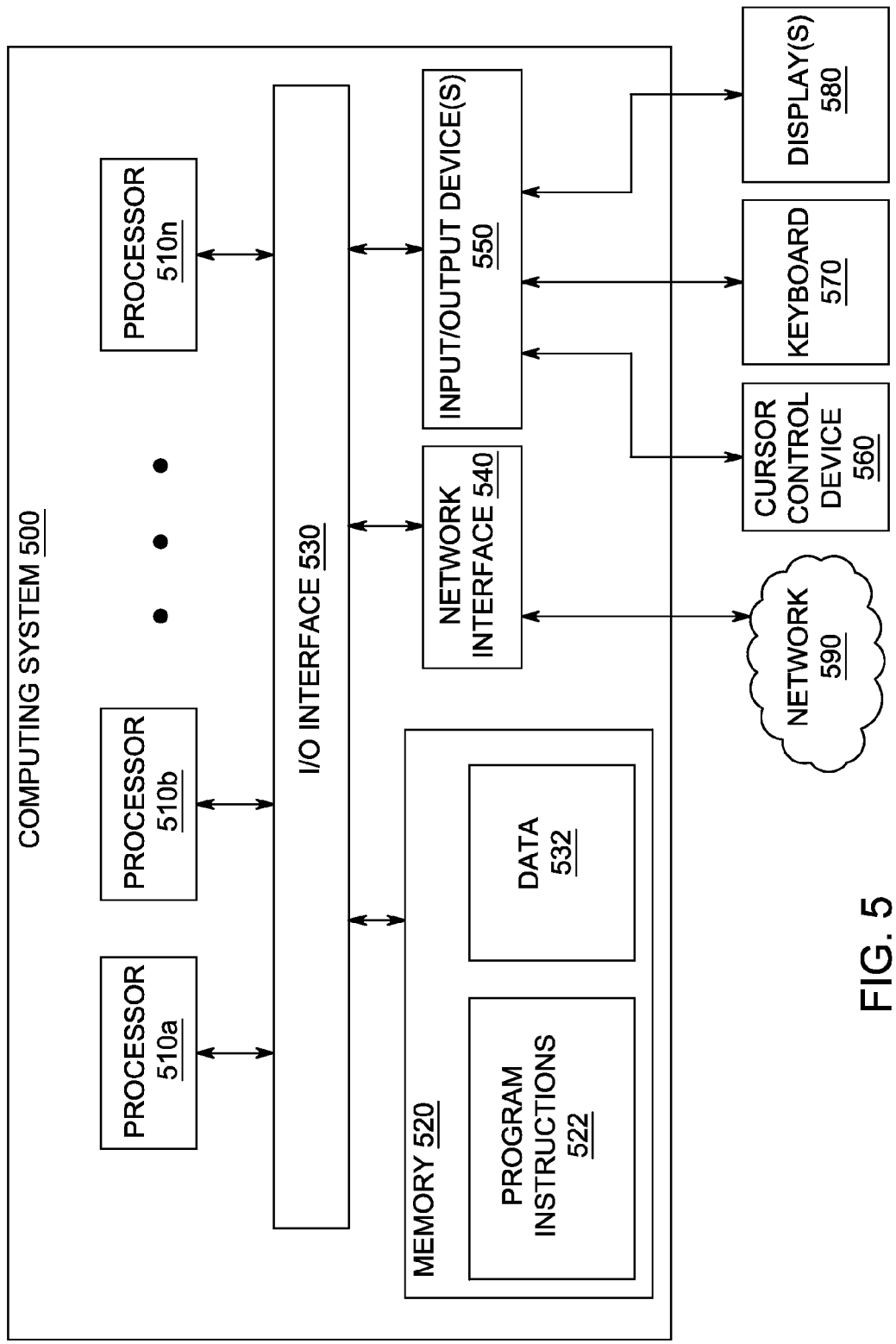
FIG. 5 depicts a computer system used to execute software to implement the online presentation environment of FIG. 1 in accordance with at least one embodiment of the invention.

Various embodiments of a method and apparatus for identifying referenced content in an on-line presentation environment as described herein, may be executed on one or more computer systems, which may interact with various other devices. One such computer system is computer system 500 illustrated by FIG. 5, which may in various embodiments implement any of the elements or functionality illustrated in FIGS. 2-4. In various embodiments, computer system 500 may be configured to implement the collaboration server 102 or the client computers 134 described above. While the illustrated system demonstrates computer system 500 implementing the on-line presentation environment, computer system 500 may be used to implement any other system, device, element, functionality or method of the above-described embodiments. In the illustrated embodiments, computer system 500 may be configured to implement the on-line presentation environment as processor-executable executable program instructions 522 (e.g., program instructions executable by processor(s) 510*a*, 510*b*, 510*n*) in various embodiments.

In the illustrated embodiment, computer system 500 includes one or more processors 510*a*, 510*b*, ... 510*n* coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of components may be utilized by the on-line presentation environment to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x96, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or data 532 accessible by processor 510. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one components (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure.

Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Various elements, devices, modules and circuits are described above in association with their respective functions. These elements, devices, modules and circuits are considered means for performing their respective functions as described herein.

While the foregoing is directed to embodiments of the present invention, other and further embodiments of the invention may be devised without departing from the basic scope thereof, and the scope thereof is determined by the claims that follow.

The invention claimed is:

1. A computer implemented method for identifying referenced content within an online presentation environment comprising:
   upon entry of a statement into an online presentation user interface related to specific content of a presentation being presented within the online presentation environment, identifying the specific content within the presentation;
   determining, using a processor, a location of a presentation pointer within the presentation, wherein determining comprises:
      logging, within a pointer location log, locations of the presentation pointer as the presentation pointer is used during the presentation;
      storing a first time when the statement begins to be entered;
      storing a second time upon completion of the statement;
      computing an estimated location of the presentation pointer using the first time and the second time, wherein the pointer location estimate is a weighted mean that estimates the position of the pointer prior to entry of the statement;
      retrieving from the pointer location log a specific location that is nearest the estimated location; and
      storing the specific location to identify the specific content in relation to the statement; and
   upon subsequent selection of the statement, displaying the specific content.

2. The method of claim 1 wherein identifying further comprises:
   identifying the specific content as content proximate the location.

3. The method of claim 1 wherein the specific location comprises a page identifier of the presentation and a two-dimensional coordinate on the page.

4. The method of claim 1 further comprising:
   upon entry of a second statement, wherein the second statement is related to the first statement, storing the specific location related to the first statement to identify the specific content in relation to the second statement.

5. The method of claim 1 wherein displaying further comprises:
   identifying a selected statement within the online presentation environment;
   accessing the specific location; and
   displaying the specific content located at the specific location.

6. The method of claim 1 performed by at least one processor when executing non-transient computer instructions stored on a computer readable medium.

7. The method of claim 1 further comprising, when displaying the specific content, providing indicia to accentuate the specific content.

8. The method of claim 1 further comprising, upon mousing over a statement, generating at least one of a pop up displaying the specific content or displaying a location of the specific content.

9. A computer implemented method for identifying referenced content within an online presentation environment comprising:
   logging, within a pointer location log in a computer memory, locations of a presentation pointer as the presentation pointer is used during the presentation;
   storing in the computer memory a first time when a statement begins to be entered into the online presentation environment;
   storing in the computer memory a second time upon completion of the statement entered into the online presentation environment;
   computing, using a processor coupled to the computer memory, an estimated location of the presentation pointer using the first time and the second time, wherein the pointer location estimate is a weighted mean that estimates the position of the pointer prior to entry of the statement;
   retrieving from the pointer location log a specific location that is nearest the estimated location; and
   storing the specific location to identify the specific content in relation to the statement.

10. The method of claim 9 wherein the specific location comprises a page identifier of the presentation and a two-dimensional coordinate on the page.

11. The method of claim 9 further comprising:
   upon entry of a second statement, wherein the second statement is related to the first statement, storing the specific location related to the first statement to identify the specific content in relation to the second statement.

12. The method of claim 9 wherein displaying further comprises:
   identifying a selected statement within the online presentation environment;
   accessing the specific location; and
   displaying the specific content located at the specific location.

13. The method of claim 9 performed by at least one processor when executing non-transient computer instructions stored on a computer readable medium.

14. Apparatus for identifying referenced content within an online presentation environment comprising:
   a collaboration server for supporting the online presentation environment comprising a presentation;
   a presenter computer, coupled to the collaboration server, for manipulating a presentation pointer within the presentation;
   at least one participant computer, coupled to the collaboration server, for viewing the presentation and entering a statement regarding the presentation;

wherein the collaboration server, upon entry of the statement related to specific content being presented within the online presentation environment, executes a pointer location generator for logging, within a pointer location log, locations of the presentation pointer as the presentation pointer is used during the presentation; storing a first time when the statement begins to be entered; storing a second time upon completion of the statement; computing an estimated location of the presentation pointer using the first time and the second time, wherein the pointer location estimate is a weighted mean that estimates the position of the pointer prior to entry of the statement; retrieving from the pointer location log a specific location that is nearest the estimated location; storing the specific location to identify the specific content in relation to the statement, and identifies the specific content within the presentation; and upon subsequent selection of the statement, displays the specific content.

15. The apparatus of claim 14 wherein the collaboration server identifies the specific content as content proximate the location.

16. The apparatus of claim 14 wherein the specific location comprises a page identifier of the presentation and a two-dimensional coordinate on the page.

17. The apparatus of claim 14 further comprising:
upon entry of a second statement, wherein the second statement is related to the first statement, storing the specific location related to the first statement to identify the specific content in relation to the second statement.

18. The apparatus of claim 14 wherein the collaboration server executes a pointer location retrieval module for:
identifying a selected statement within the online presentation environment;
accessing the specific location; and
displaying the specific content located at the specific location.

* * * * *